(12) United States Patent
Gallet

(10) Patent No.: US 9,090,336 B2
(45) Date of Patent: Jul. 28, 2015

(54) DEVICE FOR CONTROLLING THE PITCH OF TURBOPROP FAN BLADES

(75) Inventor: Francois Gallet, Paris (FR)

(73) Assignee: SNECMA, Paris (FR)

(*) Notice: Subject to any disclaimer, the term of this patent is extended or adjusted under 35 U.S.C. 154(b) by 590 days.

(21) Appl. No.: 13/544,127

(22) Filed: Jul. 9, 2012

(65) Prior Publication Data

US 2013/0017087 A1    Jan. 17, 2013

(30) Foreign Application Priority Data

Jul. 13, 2011  (FR) ...................................... 11 56443

(51) Int. Cl.
*B64C 11/30* (2006.01)
*B64C 11/38* (2006.01)
*B64D 27/02* (2006.01)

(52) U.S. Cl.
CPC ............... *B64C 11/306* (2013.01); *B64C 11/38* (2013.01); *B64D 2027/026* (2013.01)

(58) Field of Classification Search
CPC .... B64C 11/306; B64C 11/308; B64C 11/38; B64C 11/385; B64C 11/40; B64C 11/42; F04D 29/323; F04D 29/362; F04D 29/364; F04D 29/36; F05B 2260/70
See application file for complete search history.

(56) References Cited

U.S. PATENT DOCUMENTS

| 4,657,484 A | 4/1987 | Wakeman et al. | |
| 4,753,572 A * | 6/1988 | Kusiak | 416/46 |
| 4,913,623 A * | 4/1990 | Schilling et al. | 416/51 |
| 8,336,290 B2 * | 12/2012 | Glynn et al. | 60/268 |
| 2010/0104438 A1 | 4/2010 | Charier et al. | |
| 2012/0070290 A1 | 3/2012 | Balk et al. | |
| 2012/0070292 A1 | 3/2012 | Balk et al. | |

FOREIGN PATENT DOCUMENTS

WO    2010/136685 A2    12/2010

OTHER PUBLICATIONS

French Preliminary Search Report issued Feb. 27, 2012, in corresponding Patent Application No. FR 1156443 filed on Jul. 13, 2011 (with an English Translation of Categories).

* cited by examiner

*Primary Examiner* — Edward Look
*Assistant Examiner* — Jason Davis
(74) *Attorney, Agent, or Firm* — Oblon, McClelland, Maier & Neustadt, L.L.P.

(57) ABSTRACT

The invention provides a device for controlling the pitch of the fan blades of a turboprop, the device comprising: at least one set of adjustable pitch fan blades, the set being constrained to rotate with a rotary ring mechanically linked to a rotor; a synchronizing ring coupled to each blade of the set in order to adjust its pitch; an actuator centered on the longitudinal axis of the turboprop and constrained to rotate with the rotor; and control links, each connected firstly to the actuator rod and secondly to an inside end of a cylindrical shaft via a crank capable of imparting turning movement to the shaft about its axis of revolution, an outside end of the shaft being coupled to a blade in order to adjust its pitch.

9 Claims, 3 Drawing Sheets

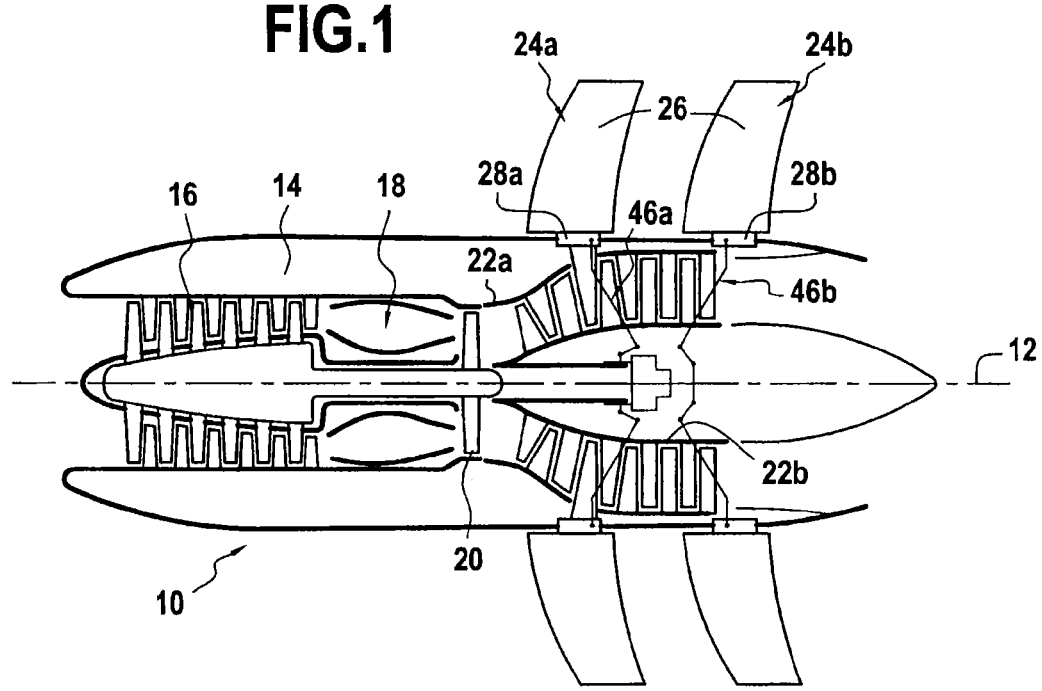
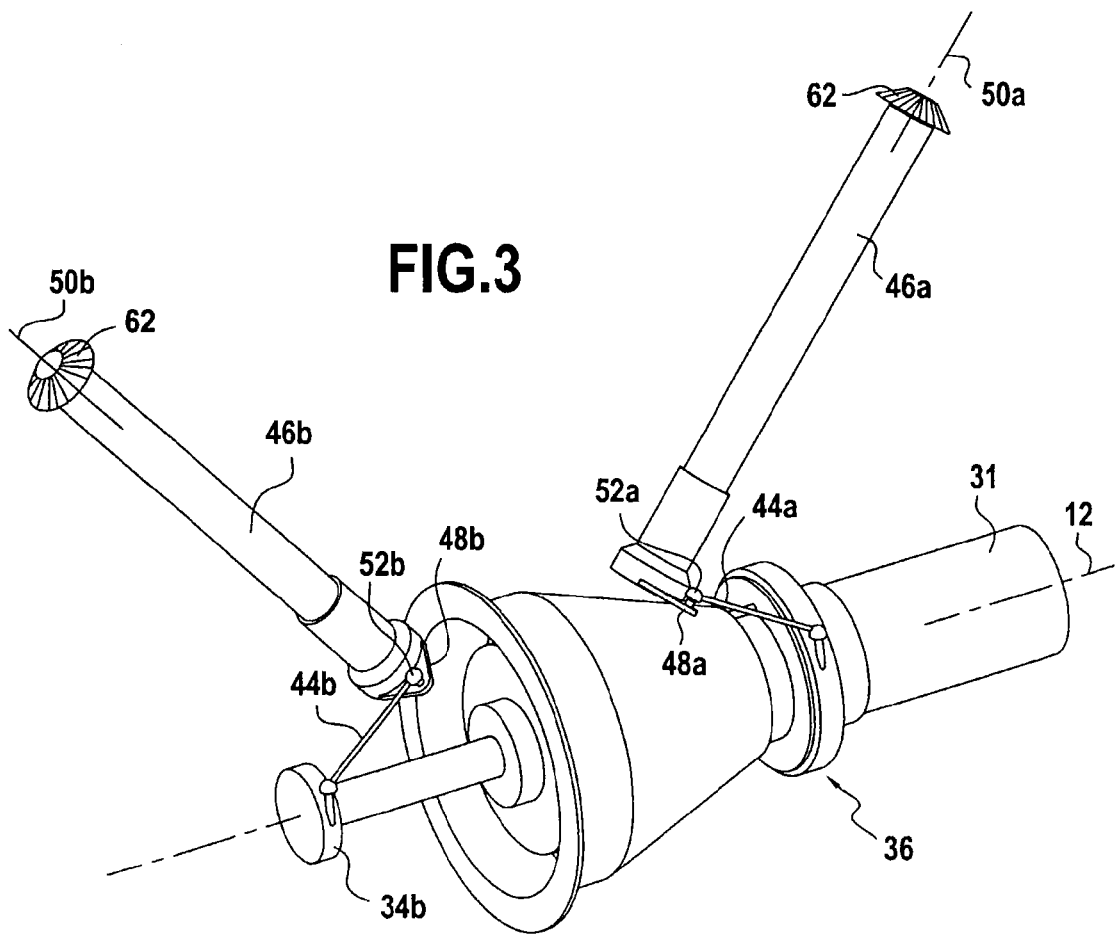

DEVICE FOR CONTROLLING THE PITCH OF TURBOPROP FAN BLADES

BACKGROUND OF THE INVENTION

The present invention relates to the general field of turboprops having at least one set of fan blades of adjustable pitch. The invention relates more particularly to controlling the pitch of the fan blades of an airplane turboprop having two propellers.

In known manner, a two-propeller airplane turboprop comprises a turbine driving two contrarotating rotors, each driving a set of unducted fan blades. By way of example, reference may be made to document GB 2 129 502, which describes various ways of embodying such a turboprop.

In that type of turboprop, the pitch of the fan blades in each set (i.e. the angular orientation of each blade about a radial axis) constitutes one of the parameters making it possible to control the thrust from the turboprop and the speed of rotation of the propellers.

Various solutions have been proposed for controlling the pitch of the fan blades in a given set. By way of example, reference may be made to patent applications FR 2 946 010, FR 2 946 011, and FR 2 946 012 filed by the Applicant. In those documents, in order to adjust the pitch of the blades, provision is made to couple them to a synchronizing ring that can be turned by means of a central actuator and a connecting arm.

OBJECT AND SUMMARY OF THE INVENTION

A main object of the present invention is to provide another solution for controlling the pitch of turboprop fan blades that is simple to implement while being reliable and light in weight.

This object is achieved by a device for controlling the pitch of the fan blades of a turboprop, the device comprising: at least one set of adjustable-pitch fan blades, said set being constrained to rotate with a rotary ring centered on a longitudinal axis of the turboprop and mechanically linked to a rotor; a synchronizing ring centered on the longitudinal axis of the turboprop and coupled to each blade of the set in order to adjust its pitch; an actuator centered on the longitudinal axis of the turboprop and constrained to rotate with the rotor; and control links, each connected firstly to the actuator rod and secondly to an inside end of a cylindrical shaft via a crank capable of imparting turning movement to the shaft about its axis of revolution, an outside end of the shaft being coupled to a blade in order to adjust its pitch.

Such a control device presents numerous advantages, and in particular it is reliable and light in weight because it possesses relatively few parts and the mechanical connections between them are simple. In particular, there are no intermediate parts for providing guidance in rotation or in translation, where such parts would be difficult to develop and would suffer from wear phenomena. Since the actuator is centered on the longitudinal axis of the turboprop, it is subjected to no centrifugal force and it is easily accessible for verification and maintenance operations.

Preferably, each blade is associated with a counterweight pivotally mounted on the synchronizing ring and connected by a system of counterweight links to a rotary casing so as to be capable of imparting a turning movement to the synchronizing ring about the longitudinal axis of the turboprop. The presence of counterweights secured to the synchronizing ring (as opposed to the rotary ring) enables the weight of the counterweight to be limited.

Under such circumstances, an angular position of the counterweight that is directed radially towards the outside of the synchronizing ring may correspond to a position in which the blades are feathered, whereas an angular position of the counterweight directed radially towards the inside of the synchronizing ring so as to form an angle of −30° relative to a radial plane may correspond to a thrust-reversal position of the blades.

Each blade may be fastened via its root to a blade support that is pivotally mounted on the rotary ring. Under such circumstances, each blade support may be connected to the synchronizing ring via a blade support link and the outside end of each shaft may be coupled to one of the blade supports via bevel gearing.

The set may comprise ten fan blades and the device may have at least two shafts, each coupled by its outside end to a respective blade.

The invention also provides a two-propeller turboprop comprising a turbine having two contrarotating rotors and two sets of adjustable pitch fan blades constrained to rotate with two rotary rings respectively linked to the rotors, the pitch of the fan blades of at least one of the sets being controlled by a control device as defined above. Under such circumstances, the actuators of the pitch control devices of the fan blades may comprise concentric chambers.

BRIEF DESCRIPTION OF THE DRAWINGS

Other characteristics and advantages of the present invention appear from the following description made with reference to the accompanying drawings that show an embodiment having no limiting character. In the figures:

FIG. 1 is a diagrammatic longitudinal section view of a two-propeller turboprop having a device of the invention for controlling the pitch of the propellers;

FIG. 3 is a perspective view showing a portion of the propeller pitch control for the downstream set;

DETAILED DESCRIPTION OF THE INVENTION

Figure 2:
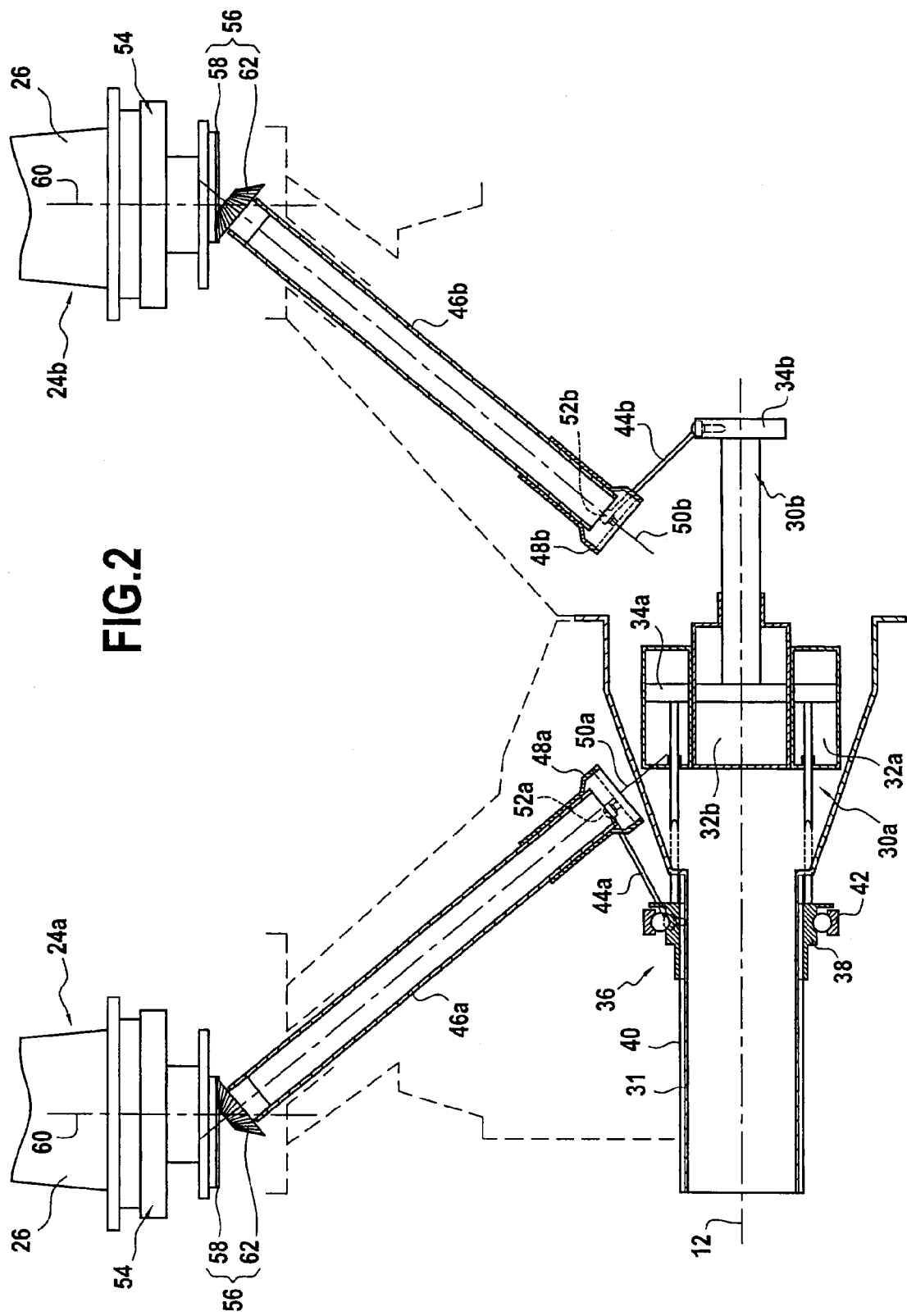
FIG. 2 is an enlarged view of FIG. 1 showing the propeller pitch control for the upstream and downstream sets.

FIG. 1 is a highly diagrammatic view of an embodiment of an airplane turboprop of the type having two propellers.

Such a turboprop is known and is therefore not described in detail. The turboprop 10 comprises in particular a longitudinal axis 12 and an annular nacelle 14 arranged coaxially around the longitudinal axis. The turboprop 10 also comprises, from upstream to downstream: a compressor 16; a combustion chamber 18; and a turbine 20 having two contrarotating rotors 22a and 22b, these various elements being arranged coaxially around the longitudinal axis 12.

The turboprop 10 also has an upstream (or front) set 24a and a downstream (or rear) set 24b of adjustable pitch fan blades 26. The fan blades 26 of each set 24a, 24b are mounted more precisely on a rotary ring 28a, 28b in the form of an annular platform centered on the longitudinal axis 12 of the turboprop.

The fan blades 26 of each set are also regularly spaced apart circumferentially, and they extend radially from the surface of the respective rotor ring 28a, 28b (they are not ducted). Each rotor 22a, 22b carries and drives in rotation a respective one of the rotary rings 28a, 28b having one of the sets 24a, 24b of adjustable-pitch fan blades mounted thereon.

The turboprop also has devices in accordance with the invention for controlling the pitch of the fan blades in each set 24a, 24b.

With reference to FIGS. 2 and 3, each control device comprises an actuator 30a, 30b (of the hydraulic type in this example) arranged on the longitudinal axis 12 of the turboprop and constrained to rotate with a shaft of one of the rotors 22a, 22b. More precisely, in the example described, each actuator 30a, 30b is constrained to rotate with a shaft 31 of the rotor that drives rotation of the downstream set 24b.

Each actuator 30a, 30b has a chamber 32a, 32b fed with hydraulic fluid (the chambers 32a, 32b are concentric one around the other) so as to be capable of moving a rod 34a, 34b along the longitudinal axis 12. The rod 34a of the outer actuator 30a serves to adjust the pitch of the blades of the upstream set 24a, whereas the rod 34b of the inner actuator 30b serves to adjust the pitch of the blades of the downstream set 24b.

Furthermore, since the outer actuator 30a is constrained to rotate with the shaft 31 of the rotor 22b while being connected to the upstream set 24a in order to adjust the pitch of its blades, it is necessary to introduce a rolling bearing 36 that transfers the control movement from the downstream frame of reference to the upstream frame of reference.

More precisely, the inner ring 38 of the rolling bearing 36 is mounted on the shaft 31 of the rotor 22b by fluting 40 and is connected to the rod 34a of the outer actuator 30a. The outer ring 42 of the rolling bearing is connected to the mechanism for changing the pitch of the fan blades of the upstream set. Thus, the rolling bearing 36 moves in rotation with the shaft 31 of the rotor 22b relative to a shaft of the rotor 22a.

The rods 34a, 34b of the actuators are connected to respective pluralities of control links 44a, 44b (at least two each), each of the links also being connected to an inside end of a respective cylindrical shaft 46a, 46b via a respective crank 48a, 48b (the term "inside" end is used herein to mean the end of the cylindrical shaft that is the closer to the longitudinal axis 12).

The cranks 48a, 48b are arranged in such a manner as to be capable of delivering turning movement to the corresponding cylindrical shaft 46a, 46b about its axis of revolution 50a, 50b. For this purpose, each crank presents a finger 52a, 52b that is eccentric relative to the axis of revolution 50a, 50b of a cylindrical shaft and having the control link 44a, 44b fastened thereto.

As a result, it can readily be understood that movement of the actuator rods 34a, 34b along the longitudinal axis 12 applies traction to the control links, this traction giving rise to turning movement of the cylindrical shafts 46a, 46b about their respective axes of revolution.

Furthermore, the outside end of each cylindrical shaft 46a, 46b is coupled to one of the blades of the corresponding set in order to adjust its pitch angle.

For example, as shown in FIG. 2, each blade 26 in the sets 24a, 24b is coupled to a blade root support 54 that is pivotally mounted on the rotary ring (not shown in the figure), and the outside end of each cylindrical shaft is coupled via bevel gearing 56 to one of these blade supports. The bevel gearing 56 may comprise a first toothed wheel 58 secured to the blade root 54 and centered on an axis 60 extending radially to the rotary ring, and a second toothed wheel 62 mounted on the outer end of the corresponding cylindrical shaft.

Thus, turning of the cylindrical shafts 46a, 46b about their respective axes of revolution 50a, 50b causes the corresponding blade root support 54 to turn angularly about the corresponding radial axis 60.

The control device of the invention also includes a synchronizing ring 64a, 64b centered on the longitudinal axis of the turboprop and of diameter that is substantially equal to the diameter of the corresponding rotary ring 28a, 28b.

Figure 4:
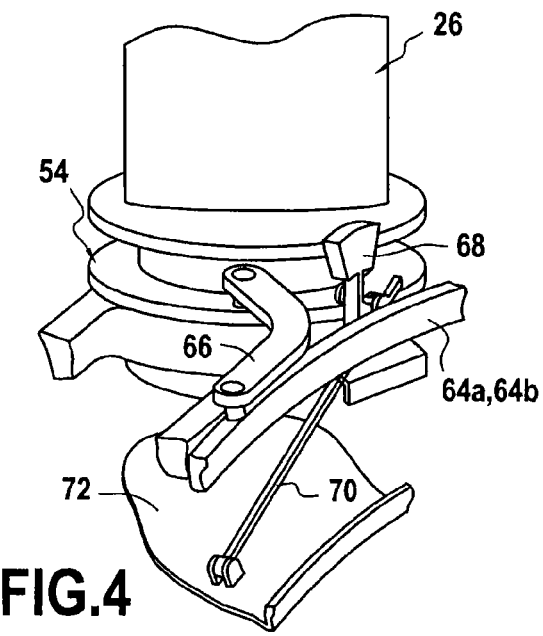
FIGS. 4 and 5 show how the synchronizing ring of a control device in accordance with the invention is driven.
Figure 5:
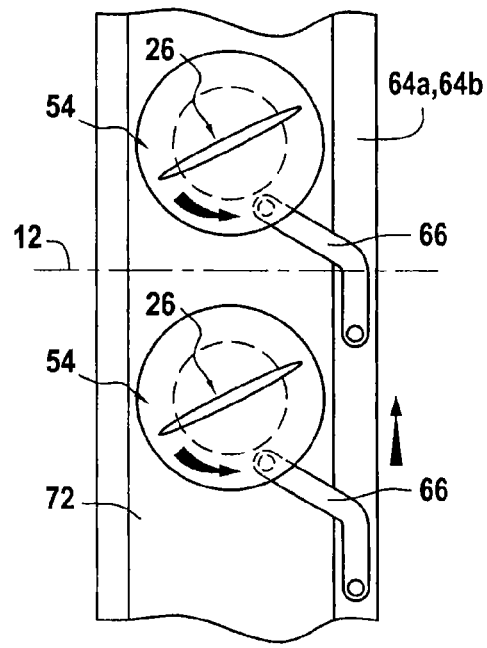

As shown in FIGS. 4 and 5, this synchronizing ring 64a, 64b is also connected to each blade root support 54 via a blade support link 66. As a result, turning of the synchronizing ring about the longitudinal axis 12 changes the angular setting for each blade mounted on the rotary ring in identical manner.

Thus, the movement of the actuator rods causes some of the blades in the corresponding set of blades to turn through an angle, with the other blades in the set being pivoted angularly by the same amount by means of the synchronizing ring that is turned by the blade support links.

With reference to FIGS. 6A to 6D, there follows a description of how various different angular settings of the blades are obtained by means of the control device of the invention.

Each blade 26 of the upstream and downstream sets is associated with a counterweight 68 pivotally mounted on the corresponding synchronizing ring 64a, 64b. The counterweight 68 is also connected by a system of counterweight links 70 to a rotary casing 72 so as to be capable of imparting a turning movement to the synchronizing ring about the longitudinal axis of the turboprop.

Thus, as shown in FIGS. 6A to 6D, when the counterweight 68 pivots about a tangential axis 74 under the effect of the centrifugal force resulting from rotation of the synchronizing ring 64a, 64b on which it is fastened, it causes the synchronizing ring to move angularly about the longitudinal axis of the turboprop, and consequently changes the angular setting of the blades.

FIGS. 6A to 6D show more precisely various different settings for a blade as a function of the angular position of the counterweight 68 associated therewith.

Figure 6A:
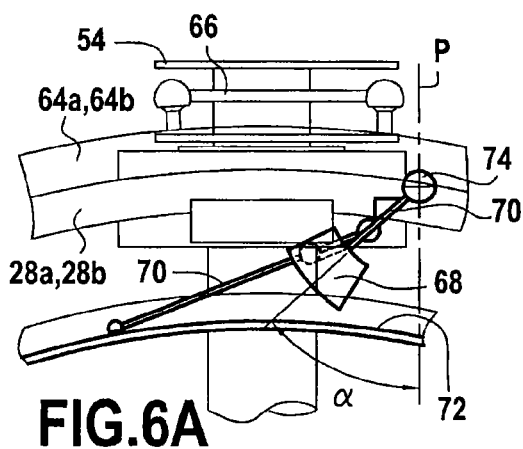
FIGS. 6A to 6D show how different blade settings are obtained by a control device of the invention.

In FIG. 6A, the counterweight 68 is in an angular position (relative to its pivot axis 74) that forms an angle α of −30° with a radial plane P. This position corresponds to a thrust-reversal position for the associated blade. With such a setting, the blade is in a reverse-pitch position in order to create reverse thrust for braking the aircraft.

It should be observed that this reverse-thrust position, which is one of the two extreme angular positions of the blades, could be obtained by calibrating the actuators of the control device in such a manner that their rods are in a fully-retracted position.

Figure 6B:
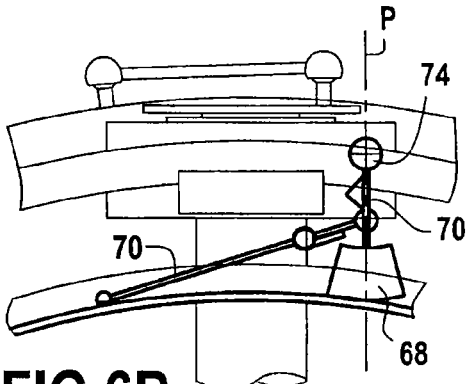

In FIG. 6B, the counterweight 68 is in an angular position directed radially towards the inside of the corresponding synchronizing ring 64a, 64b (and forms an angle of zero degrees with the radial plane P). This is the position that provides a minimum return force on the counterweight and it may correspond to the associated blade being set in a so-called "0° position". This setting must nevertheless be transient on passing towards the thrust-reversal position (as shown in FIG. 6A).

Figure 6C:
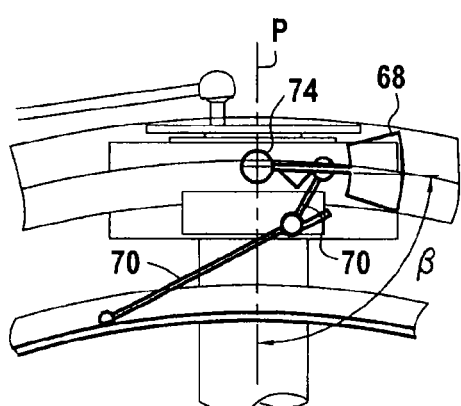

In FIG. 6C, the counterweight 68 is in an angular position that forms an angle β of +45° relative to the radial plane P. Such a blade setting corresponds to an in-flight position in which the blade is in a position to create thrust.

Figure 6D:
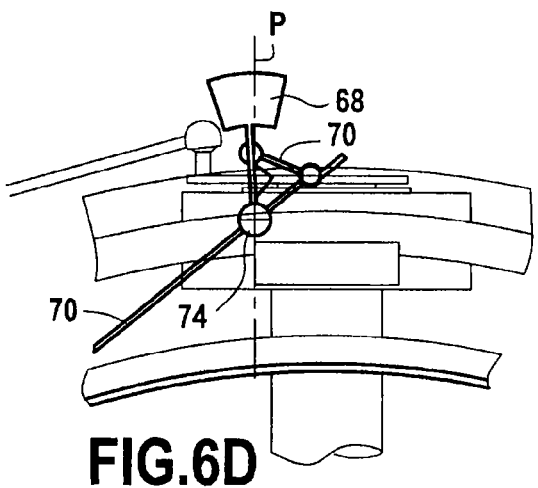

Finally, in FIG. 6D, the counterweight 68 is in an angular position that is directed radially towards the outside of the corresponding synchronizing ring 64a, 64b (and that forms an angle of zero degrees with the radial plane P). This position provides a minimum return force on the counterweight and may correspond to a position in which the associated blade is feathered. In this position, also known as the position of minimum incidence, the blade is arranged (along the longitudinal axis of the turboprop) in the forward direction of the airplane so as to minimize drag. This is a safety position.

It should be observed that this feathered position, which is the other extreme angular position of the blades (the first extreme position being the thrust-reversal position), may be obtained by calibrating the actuators of the control device so that their rods are in the fully-extended position (i.e. in the position opposite from the position occupied for thrust reversal).

What is claimed is:

1. A device for controlling the pitch of the fan blades of a turboprop, the device comprising:
   at least one set of adjustable pitch fan blades, said set being constrained to rotate with a rotary ring centered on a longitudinal axis of the turboprop and mechanically linked to a rotor;
   a synchronizing ring centered on the longitudinal axis of the turboprop and coupled to each blade of the set in order to adjust its pitch; and
   an actuator centered on the longitudinal axis of the turboprop and constrained to rotate with the rotor;
   wherein the control device further comprises control links, each connected firstly to an actuator rod and secondly to an inside end of a cylindrical shaft via a crank capable of imparting turning movement to the shaft about its axis of revolution, an outside end of the shaft being coupled to a blade in order to adjust its pitch.

2. A device according to claim 1, wherein each blade is associated with a counterweight pivotally mounted on the synchronizing ring and connected by a system of counterweight links to a rotary casing so as to be capable of imparting a turning movement to the synchronizing ring about the longitudinal axis of the turboprop.

3. A device according to claim 2, wherein an angular position of the counterweight that is directed radially towards the outside of the synchronizing ring corresponds to a position in which the blades are feathered, whereas an angular position of the counterweight directed radially towards the inside of the synchronizing ring so as to form an angle of −30° relative to a radial plane corresponds to a thrust-reversal position of the blades.

4. A device according to claim 1, wherein each blade is fastened via its root to a blade support that is pivotally mounted on the rotary ring.

5. A device according to claim 4, wherein each blade support is connected to the synchronizing ring via a blade support link.

6. A device according to claim 4, wherein the outside end of each shaft is coupled to one of the blade supports via bevel gearing.

7. A device according to claim 1, wherein the set comprises ten fan blades and the device has at least two shafts, each coupled by its outside end to a respective blade.

8. A two-propeller turboprop comprising a turbine having two contrarotating rotors and two sets of adjustable pitch fan blades constrained to rotate with two rotary rings respectively linked to the rotors, the pitch of the fan blades of at least one of the sets being controlled by a device according to claim 1.

9. A turboprop according to claim 8, wherein the actuators of the pitch control devices of the fan blades comprise concentric chambers.

* * * * *